Oct. 7, 1941. N. K. FERRIER 2,257,736
MAGNETIC INSPECTION UNIT
Filed Jan. 2, 1940
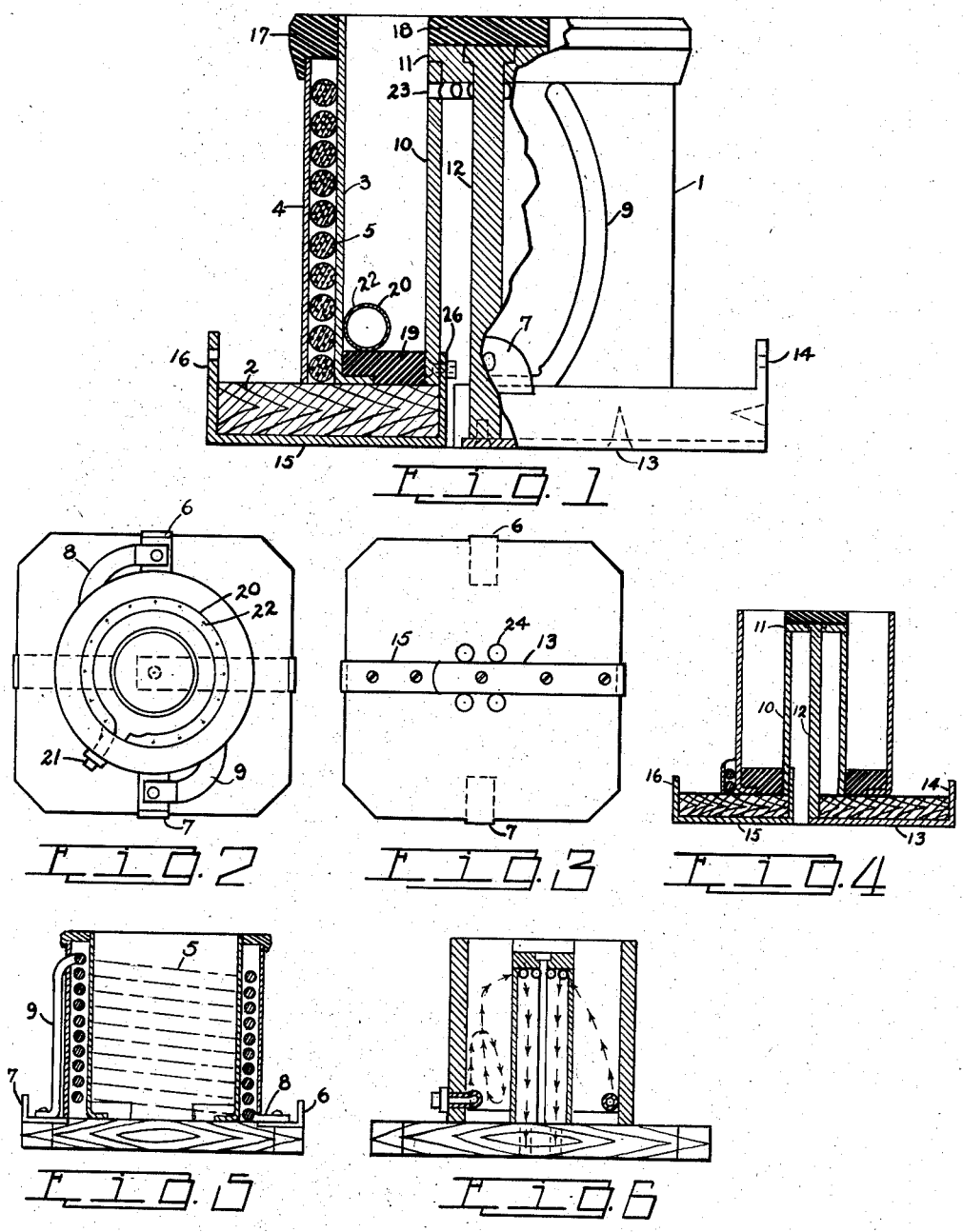
INVENTOR
*NORMAN K. FERRIER*
BY
ATTORNEY Patented Oct. 7, 1941

2,257,736

UNITED STATES PATENT OFFICE 2,257,736

MAGNETIC INSPECTION UNIT

Norman K. Ferrier, Valley City, Ohio

Application January 2, 1940, Serial No. 312,172

7 Claims. (Cl. 175—183)

(Granted under the act of March 3, 1883, as amended April 30, 1928; 370 O. G. 757)

This invention relates to a unit for use in the inspection of cylinders of internal combustion engines and articles of similar shape, by a method of magnetic inspection commonly known to the art.

In this method of inspection the article to be tested is placed within or has induced within it a magnetic field. It is then flooded with a fluid containing paramagnetic particles. The magnetic lines of force tend to leak out or escape at any crack, score or similar defect in the piece being tested. As a result, the paramagnetic particles are attracted to these defects and, if the excess fluid be carefully rinsed off the piece, will remain and clearly outline the defects.

Inspection by this method gives its best results when the direction of movement of the magnetic flux lies at right angles to the direction of the flaw. For this reason it is common practice to subject the test piece first to a circular magnetic field and then to a bi-polar field flowing in a direction parallel to the axis of the circular field.

Prior to this invention the means used for conducting the test comprised a grill topped table with a tank beneath, two contact pieces between which the test piece could be clamped after the fashion of work in a lathe, and a hose through which the inspection fluid could be flowed on the test piece. A hollow coil was also provided in which small pieces could be inserted for the portion of the test involving subjection to a bi-polar field. For subjecting larger pieces to inspection in such a field an insulated cable was wound about the test piece and a current passed therethrough.

It is an object of this invention to provide a single compact unit adapted to receive test pieces of a certain general shape, in which the test piece may be subjected to both a circular and a bi-polar magnetic field.

It is a further object of this invention to provide an inspection unit which will reduce the time and equipment previously required to make a magnetic inspection.

It is a further object of this invention to provide a means for applying inspection fluid to a test piece so that all parts thereof will be continuously and completely covered with fluid during the test.

It is a still further object of this invention to provide a means which will cover a test piece completely with a flood of inspection fluid flowing so gently as to prevent a washing action by the fluid.

Other objects will become apparent upon a consideration of the following description taken together with the accompanying drawing, in which:

Fig. 1 is a side elevational view, partly in section, of an inspection unit constructed in accordance with the invention;

Fig. 2 is a plan view of the unit;

Fig. 3 is a view of the unit looking from below;

Fig. 4 is a diagrammatic elevational view, in section, showing the electrical path through the unit for creating a circular magnetic field;

Fig. 5 is a diagrammatic elevational view in section, showing the electrical path through the unit for creating a bi-polar magnetic field; and Fig. 6 is a diagrammatic side elevational view in section showing the path of fluid flow through the unit.

The unit consists of a cylindrical container 1 mounted upon a base 2 of wood or other insulating material. The side walls of the container consist of an inner wall 3 and an outer wall 4, both of copper, between which is wound a coil 5 of insulated wire. The two ends 8 and 9 of this coil are attached to connection lugs 6 and 7 which are attached to the wood base on opposite sides of the container. A hollow post having copper side walls 10 extends along the axis of the cylindrical container. A copper plate 11 closes the top of the hollow post and a copper bolt 12 passes through said plate and extends downwardly through said hollow post and the wooden base and connects to a copper strip 13. The latter extends to the edge of said base and has its end turned up to serve as a connection lug 14. A second strip 15 has one end extending upwardly through a hole in the base and electrically connected to the inside of the side wall of the hollow post, as shown at 26. The opposite end of the plate is turned up to form connection lug 16. For convenience the connection lugs 14 and 16 are located at 90° intervals from the lugs 6 and 7. Secured to the top of the container side walls and to the top of the hollow post are pieces 17 and 18, respectively, made of molded plastic or other insulating material. The cylinders to be inspected rest upon these pieces.

A ring-shaped piece 19 of insulating material forms the bottom of the container. Resting upon this and against the container wall 3 is a perforated ring of pipe 20 which is led in through the container wall at 21. The outer end 21 of the pipe serves as a means for connecting it to a hose for supplying inspection fluid. The perforations 22 are located close to the wall 3 so that inspection fluid will be directed against the wall to avoid excessive rinsing action on the test piece.

Near the top of the hollow post are several perforations 23 and there are four perforations 24 through the wooden base communicating with the interior of the hollow post. The path of inspection fluid is shown in Fig. 6. Fig. 4 shows the path of electric current when the test piece is subjected to a circular or circumferential type of magnetic field, and Fig. 5 shows the path of current when the test piece is subjected to the bi-polar type of field.

In operation, the cylindrical piece to be inspected is cleaned and placed in the container with its bottom supported by the insulated piece 18. The flow of inspection fluid is now started and one of the two types of magnetic field is set up. If it be the circular type, the circuit shown in Fig. 4 is utilized with the connection lugs 14 and 16 connected to a source of current such as a battery. Current then flows in through 16, through strip 15, up the walls 10 of the hollow post, through the top piece 11, down through bolt 12, and out through strip 13 and lug 14. After the cylinder has been subjected for a short time to this type of magnetization this circuit is broken and the one shown in Fig. 5 is completed through a current source. Here the current flows through the coil 5 creating a bi-polar field within it. The flow of fluid is stopped when the current is cut off. The piece being inspected will be magnetized by this time and the paramagnetic particles will be clustered along all defects, clearly showing their location and shape. The magnetization remaining in the test piece will allow careful rinsing of excess fluid from the piece while retaining the defect indications.

The use of this unit allows the application of inspection fluid in a gently flowing bath which is far superior to the use of a hose for flowing it on. Use of the bath insures complete and simultaneous coverage of the entire surface to be inspected, with no strong currents of fluid to wash off defect indications. It also allows coverage of inside surfaces which are difficult to flood by means of a hose.

The unit also enables the operator to conduct the whole inspection with less apparatus, less manipulation of the piece being inspected, and less time consumed in the operation than has hitherto been required.

While the disclosure of this invention has been limited to one embodiment of the invention, the scope of the invention is to be considered as restricted only by the scope and limitations of the appended claims.

The invention described herein may be manufactured and/or used by or for the Government of the United States of America for governmental purposes without the payment of any royalties thereon or therefor.

I claim:

1. Means for subjecting an object to that process of magnetic inspection which involves flooding the surface of said object with a fluid containing paramagnetic particles while maintaining a magnetic field in said object, said means comprising a container for said fluid, said container being of sufficient size to contain a substantial portion of said object, means for filling said container with inspection fluid comprising means for directing fluid upwardly and uniformly over the inner surface of the side walls of said container and means associated with said container for producing within it a magnetic field of the circular type and a magnetic field of the bi-polar type.

2. In an apparatus for subjecting an object to that process of magnetic inspection which involves flooding the surface of said object with a fluid containing paramagnetic particles while maintaining a magnetic field in said object, means for flooding said object with said fluid, said means comprising a container for said fluid, said container being of sufficient size to contain a substantial portion of said object, means for filling said container with inspection fluid and maintaining a continuous flow of said fluid therethrough, said means comprising means for directing fluid upwardly and uniformly over the inner surface of the side walls of said container, and means for conducting away the excess of said fluid, said means having a fluid receiving opening located near the axis of said container and at the level at which it is desired that fluid be maintained therein.

3. Means for subjecting an object to that process of magnetic inspection which involves flooding the surface of said object with a fluid containing paramagnetic particles while maintaining a magnetic field in said object, said means comprising a container for said fluid, said container being of sufficient size to contain a substantial portion of said object, a coil of insulated wire substantially coextensive with the side walls of said container, an elongated current conducting member located within said container and extending substantially parallel to the axis thereof, means for alternatively connecting said coil and said member to a source of current, and means for directing said fluid upwardly and uniformly over the inner surface of the side walls of said container, said elongated member having a fluid conduit formed therein for carrying away the excess of said fluid, said conduit opening into said container at the level at which it is desired to maintain said fluid.

4. Means for subjecting an object to that process of magnetic inspection which involves flooding the surface of said object with a fluid containing paramagnetic particles while maintaining a magnetic field in said object, said means comprising a container for said fluid, said container being of sufficient size to contain a substantial portion of said object, a coil of insulated wire substantially coextensive with the side-walls of said container, an elongated current conducting member located within said container and extending substantially parallel to the axis thereof, said member comprising a hollow cylinder having one end closed, a rod extending from said closed end parallel to and spaced from the side-walls of said hollow cylinder, means connecting a source of current between the free end of said rod and the open end of the side-wall of said cylinder, means to connect a source of current across said coil, and means for directing said fluid upwardly and uniformly over the inner surface of the side-walls of said container, said cylinder having venting holes located at the level at which it is desired to maintain said fluid in said container.

5. Means for subjecting an object of generally hollow cylindrical shape to that process of magnetic inspection which involves flooding the surface of said object with a fluid containing paramagnetic particles, while maintaining a magnetic field in said object, comprising a cylindrical container for said fluid, said container being of sufficient size to contain a substantial portion of said object, means for introducing a continuous flow of said fluid through said container from a region near the bottom and adjacent the side walls of said container, means to lead off the excess of said fluid from said container from a point near the axis of said container and at the level at which it is desired that fluid may be maintained therein, said last named means comprising a hollow elongated cylindrical member having vent openings for said fluid formed at said desired level, and means for passing an electrical current through said member in a direction parallel to the axis thereof, thereby subjecting said object to a circular magnetic field.

6. Means for subjecting an object of generally hollow cylindrical shape to that process of magnetic inspection which involves flooding the surface of said object with a fluid containing paramagnetic particles, while maintaining a magnetic field in said object, said means comprising a container for said fluid, said container being of sufficient size to contain a substantial portion of said object and being of annular cross-section, a hollow elongated member extending upwardly along the axis of said cotnainer from and through the bottom thereof said member being of electrically conductive material and having openings formed therein at the height at which it is desired to maintain the level of said fluid in said container and being open at the bottom, whereby it acts as a conduit to carry off the excess of said fluid in said container, a coil of insulating wire wound about the walls of said container, and the means for passing electrical current through said member and said coil at will.

7. Means for subjecting an object of generally hollow cylindrical shape to that process of magnetic inspection which involves flooding the surface of said object with a fluid containing paramagnetic particles, while mantaining a magnetic field in said object, said means comprising a container for said fluid, said container being of sufficient size to contain a substantial portion of said object and being of annular cross-section, a hollow elongated member extending upwardly along the axis of said container from and through the bottom thereof, said member being of electrically conductive material and having openings formed therein at the height at which it is desired to maintain the level of said fluid in said container and being open at the bottom, whereby it acts as a conduit to carry off the excess of said fluid in said container, a coil of insulating wire wound about the walls of said container, an electrical conductor connected to the top end of said member and passing downwardly therethrough and separated from the side walls thereof, said conductors extending beneath the bottom of said container and being insulated therefrom, and terminating at accessible locations outside of said container.

NORMAN K. FERRIER.